United States Patent US 8,209,261 B2
Liu  (45) Date of Patent: *Jun. 26, 2012

(54) METHOD AND APPARATUS FOR CONNECTING A NETWORK OF ELECTRONIC SIGNS

(75) Inventor: David Wanqian Liu, San Francisco, CA (US)

(73) Assignee: RMG Networks, Inc., San Francisco, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 12/845,572

(22) Filed: Jul. 28, 2010

(65) Prior Publication Data

US 2011/0035590 A1  Feb. 10, 2011

Related U.S. Application Data

(63) Continuation of application No. 11/673,502, filed on Feb. 9, 2007, now Pat. No. 7,783,575.

(60) Provisional application No. 60/772,490, filed on Feb. 13, 2006, provisional application No. 60/778,045, filed on Mar. 2, 2006.

(51) Int. Cl.
G06F 21/00 (2006.01)

(52) U.S. Cl. ... 705/51; 705/7.12; 705/14.45; 705/14.49; 705/52; 705/14.41; 725/32; 380/227; 380/228; 380/229; 380/230

(58) Field of Classification Search ............... 705/51
See application file for complete search history.

(56) References Cited

U.S. PATENT DOCUMENTS

| | | | |
|---|---|---|---|
| 5,309,174 A | 5/1994 | Minkus | |
| 5,905,246 A | 5/1999 | Fajkowski | |
| 6,430,603 B2 | 8/2002 | Hunter | |
| 6,430,605 B2 | 8/2002 | Hunter | |
| 6,470,181 B1 | 10/2002 | Maxwell | |
| 6,543,582 B2 | 4/2003 | DiFranza et al. | |
| 6,614,450 B1 | 9/2003 | Vossler | |
| 6,615,251 B1 | 9/2003 | Klug et al. | |
| 6,947,738 B2 | 9/2005 | Skog et al. | |

(Continued)

FOREIGN PATENT DOCUMENTS

EP  792068 A2 *  8/1997

(Continued)

OTHER PUBLICATIONS

"Electronic Billboards & Electronic Signs" http://www.wirespring.com/Solutions/electronic_billboards_electronic_signs.html. Copyright 2000-2009. Retrieved online Mar. 23, 2010.*

(Continued)

Primary Examiner — James A Reagan
(74) Attorney, Agent, or Firm — Michael A. Glenn; Glenn Patent Group

(57) ABSTRACT

A method and apparatus allows owners of electronic signs, such as retailers, real estate owners, other space owners, and content providers, such as advertisers, entertainment producers, event promoters, visual artists, and the general community to participate in an open content network, in which electronic signs are universally uniquely identified and then added to a network in a distributed fashion, after which content is selectively downloaded to the electronic signs. The times at which the content is presented are determined collaboratively by the owners of the electronic signs and the content providers. A mechanism that verifies whether the content is actually presented on the electronic signs is also disclosed.

21 Claims, 15 Drawing Sheets

U.S. PATENT DOCUMENTS

| | | | |
|---|---|---|---|
| 7,069,271 | B1 | 6/2006 | Fade et al. |
| 7,120,235 | B2 | 10/2006 | Altberg et al. |
| 7,343,317 | B2 | 3/2008 | Jokinen et al. |
| 7,412,405 | B2 | 8/2008 | Huang et al. |
| 7,440,674 | B2 | 10/2008 | Plotnick et al. |
| 7,450,562 | B2 | 11/2008 | Goo et al. |
| 7,493,139 | B2 | 2/2009 | Himeno |
| 7,580,719 | B2 | 8/2009 | Karmarkar |
| 7,783,532 | B2 | 8/2010 | Hsu et al. |
| 2002/0095333 | A1 | 7/2002 | Jokinen et al. |
| 2003/0229549 | A1 | 12/2003 | Wolinsky et al. |
| 2004/0107136 | A1 | 6/2004 | Nemirofsky et al. |
| 2004/0117254 | A1 | 6/2004 | Nemirofsky et al. |
| 2004/0117255 | A1 | 6/2004 | Nemirofsky et al. |
| 2004/0210479 | A1 | 10/2004 | Perkowski et al. |
| 2005/0004840 | A1 | 1/2005 | Wanninger |
| 2005/0053220 | A1 | 3/2005 | Helbling et al. |
| 2005/0149387 | A1 | 7/2005 | O'Shea et al. |
| 2005/0221771 | A1 | 10/2005 | Himeno |
| 2006/0047568 | A1 | 3/2006 | Eisenberg et al. |
| 2006/0047572 | A1 | 3/2006 | Moore et al. |
| 2006/0142029 | A1 | 6/2006 | Shao et al. |
| 2007/0022442 | A1 | 1/2007 | Gil et al. |
| 2007/0061057 | A1 | 3/2007 | Huang et al. |
| 2007/0066341 | A1 | 3/2007 | Silverbrook et al. |
| 2007/0150339 | A1 | 6/2007 | Retter et al. |
| 2007/0150340 | A1 | 6/2007 | Cartmell |
| 2007/0208879 | A1 | 9/2007 | Liu |
| 2008/0290987 | A1 | 11/2008 | Li |

FOREIGN PATENT DOCUMENTS

| | | |
|---|---|---|
| WO | WO 2004/008281 | 1/2004 |

OTHER PUBLICATIONS

Media Tile Cellular Digital signage—Systems; Systems>>Overview; Retrieved from the Internet ,http://www.mediatile.com/systems.html.

WireSpring: Point-of-Purchase POP Displays; Retrieved from the Internet website_http://www.wirespring.com/Solutions/pop_displays.html.

"Electronic Billboards & Electronic Signs"; retrived online Mar. 23, 2010 from the internet website_http://www.wirespring.com/Solutions/electronic_biliboards_electronic_signs.html. Copyright 2000-2009.

* cited by examiner danoo 866-93-Danoo

Welcome, Hua! (Logoff)　　　　　　　　　　　　　　　　　Danoo Idea  Contact  Service

Content Management

Place an ad

Update an ad
    Cancel an ad

Review ad clips

Manage SMS coupons

Review active ads

Review artwork upload

Review submitted fun facts/trivia questions

Location Management

Register a digital sign

Update a digital sign

View my locations

Download approved location data

Download installed location data

Print campaign deck

Sign Management

Synchronize my signs

View my signs

User Management

Account management

Create a new user account

Location User Right

Update my account

Copyright © 2007 Danoo Inc. All rights reserved. Privacy policy and terms of services.

*FIG. 4* danoo 866-93-Danoo

Welcome, Hua! (Logoff)   Danoo Idea   Contact   Service

Danoo Online ▶ Place an ad

[ < Back ] [ Next > ] [ Cancel ]

Placing an ad on a Danoo digital sign takes only a few minutes! Let's start by giving your ad a short description, e.g., *J.Crew Spring 06 Sale*.

Enter Ad Description: A piece of content

[ < Back ] [ Next > ] [ Cancel ]

Copyright © 2007 Danoo Inc. All rights reserved. Privacy policy and terms of services.

*FIG. 5* danoo 866-93-Danoo

Welcome, Hua! (Logoff)    Danoo Idea  Contact  Service

Danoo Online ▸ Place an ad ▸ Select Clips ▸ Search Locations

[ < Back ] [ Next > ] [ Cancel ] [ Clear ]

Select Locations for AD

Please specify the number of digital signs you would like to place your ad on: 20

If you have certain venues and / or neighborhoods in mind, such as a chain store or a tourist spot, please enter appropriate search text in the box below. For example, enter "Cafe" to return all participating cafes.

Please further define your search by specifying geographies as follows:

If you are interested in locations in one or more cities, please make your selection(s) here.

Search by City, State

```
Berkeley, CA
Los Altos, CA
Palo Alto, CA
San Francisco, CA
South San Francisco, CA
New York, CA
```

OR

If you are interested in locations in a particular geographical area, please specify an address and a search radius.

Limit the search to locations within 5 miles [ ] miles of the following address:

Search by Address:

City, State                               Zip:
San Francisco, CA    

The Targeting Attributes and Keywords will help us further understand the target audience you have in mind and enable us to recommend locations that best suit your needs. Please fill out the following form.

Targeting Attributes

Select                                                                  Weight

[ ] Age     [ ] 18 - 24  [✓] 25 - 36     [ ] 37 - 55  [ ] 56+   Medium [ ]

*FIG. 6A*

| | | | | | |
|---|---|---|---|---|---|
| Demographics | ☐ Gender | ○ Male | ● Evenly Mixed | ○ Female | Medium ☐ |
| | ☐ Income | ○ Low | ● Medium | ○ High | Medium ☐ |
| | ☐ Marital Status | ○ Single | ● Married/Children | | Medium ☐ |
| | ☐ Occupation | ○ Blue Collar | ● White Collar | | Medium ☐ |
| | ☐ Busiest Times | ○ Morning | ● Noon | ○ Evening | Medium ☐ |
| | ☐ Serve Alcohol | ○ Yes | ● No | | Medium ☐ |
| Geographics | ☐ Decor | ○ Simple | ● Designer | | Medium ☐ |
| | ☐ Home Price Index | ○ Low | ● Medium | ○ High | Medium ☐ |
| | ☐ Tourism Index | ○ Low | ● Medium | ○ High | Medium ☐ |

Keywords

| | Select | | | Select | |
|---|---|---|---|---|---|
| Ethnicity | ☐ | African Americans/Blacks | | ☐ | Home |
| | ☐ | American Indians/Alaska Natives | Assets | ☐ | Car |
| | ☐ | Asian/Pacific Islanders | | ☐ | Investment |
| | ☐ | Hispanics/Latinos | Sexuality | ☐ | Straight |
| | ☐ | Immigrants | | ☐ | Gay |
| | | | Lifestyle | ☐ | Active |
| | | | | ☐ | Relaxed |
| Taste | ☐ | Image Conscious | | ☐ | Art |
| | ☐ | Earthy | Interests | ☐ | Music |
| | ☐ | Clean Cut | | ☐ | Sports |
| | ☐ | Hip | | ☐ | Health & Fitness |

Click here to hide advanced search options.

[ < Back ] [ Next > ] [ Cancel ] [ Clear ]

Copyright © 2007 Danoo Inc. All rights reserved. Privacy policy and terms of services.

*FIG. 6B* danoo 866-93-Danoo

Welcome, Hua! (Logoff)  Danoo Idea Contact Service

Danoo Online ▶ Place an ad ▶ Select Clips

[< Back] [Next >] [Cancel]

Contents can be still pictures, slide shows, flash files or mpeg videos. You can either use contents you previously created or click here to create new clips. If you select more than one item they will be displayed sequentially in the time slots you purchased.

Ad Type: ● Danoomedia's ○ Venue's ○ Customer's

**Select clips for *A piece of content*. Click on a description link to preview the clip.**

| Select | Description | Type | Last Update | Length | Edit | Del |
|---|---|---|---|---|---|---|
| ☐ | works-black | 🗇 | 01/07/2007 23:17 | 60 sec. | Edit | Del |
| ☐ | works-white | 🗇 | 01/07/2007 23:13 | 60 sec. | Edit | Del |
| ☐ | jan19pier39sealions | ƒ | 01/07/2007 21:26 | 60 sec. | Edit | Del |
| ☐ | jan18-20symphonyhallmozart | ƒ | 01/07/2007 21:22 | 60 sec. | Edit | Del |
| ☐ | jan18-19presidioyoungartists | ƒ | 01/07/2007 21:06 | 60 sec. | Edit | Del |
| ☐ | jan17oaklandmuseumraphiphopfilm | ƒ | 01/07/2007 21:02 | 60 sec. | Edit | Del |
| ☐ | jan16symphonyhallpianofestival | ƒ | 01/07/2007 20:59 | 60 sec. | Edit | Del |
| ☐ | jan15africandance | ƒ | 01/07/2007 20:44 | 60 sec. | Edit | Del |
| ☐ | jan13-15martinlutherking | ƒ | 01/07/2007 20:24 | 60 sec. | Edit | Del |
| ☐ | jan11-17castrotheaterberlinandbeyond | ƒ | 01/07/2007 20:13 | 60 sec. | Edit | Del |

[< Back] [Next >] [Cancel]

Copyright © 2007 Danoo Inc. All rights reserved. Privacy policy and terms of services.

FIG. 7 danoo 866-93-Danoo

Welcome, Hua! (Logoff)                                    Danoo Idea  Contact  Service Danoo Online ▸ Place an ad ▸ Select Clips ▸ Search Locations ▸ Select Locations ▸ Schedule Ad

[ < Back ] [ Next > ] [ Cancel ]

Specify the start date and duration for your ad.

Schedule for *A piece of content*

Start Week: 2007-02-07  [ Date ]
Duration:  2 Weeks  [ ]

Click here for advanced scheduling options

[ < Back ] [ Next > ] [ Cancel ]

Copyright © 2007 Danoo Inc. All rights reserved. Privacy policy and terms of services.

*FIG. 8* danoo 866-93-Danoo

Welcome, Hua! (Logoff)   Danoo Idea  Contact  Service

Danoo Online ▶ Place an ad ▶ Select Clips ▶ Search Locations ▶ Select Locations

[ < Back ]  [ Next > ]  [ Cancel ]

Select Locations for *A piece of content*
<< Page 1 of 1 Pages, Total 69 pad(s) >>

| Select | Business Name | Location Type | Address | Neighborhood | City | State | Location | Sign |
|---|---|---|---|---|---|---|---|---|
| ✓ | 4th Street Bar | Bar | 55 4th St. | SOMA | San Francisco | CA | SF0234 | D0234 |
| ✓ | Alex's | Bar | 4528 Mission St | Mission | San Francisco | CA | SF0054 | D0054 |
| ✓ | Ali Baba | Cafe | 799 Valencia St | Mission | San Francisco | CA | SF0143 | D0143 |
| ✓ | Ali Baba's Cave Cafe | Restaurant | 531 Haight St | Haight Ashbury | San Francisco | CA | SF0142 | D0142 |
| ✓ | Alvin's | Cafe | 1708 Irving St | Sunset / Richmond | San Francisco | CA | SF0074 | D0074 |
| ✓ | Baladie Gourmet Cafe | Cafe | 337 Kearney St. | Financial District | San Francisco | CA | SF0221 | D0221 |
| ✓ | Bar None | Bar | 1980 Union St | Marina | San Francisco | CA | SF0089 | D0089 |
| ✓ | Bayside Sports Bar & Grill | Bar | 1787 Union St | Marina | San Francisco | CA | SF0090 | D0090 |
| ✓ | Beale Street Bar & Grill | Bar | 133 Beale St | Financial District | San Francisco | CA | SF0023 | D0023 |
| ✓ | Bella Luca | Cafe | 418 Geary St. | Financial District | San Francisco | CA | SF0010 | D0010 |
| ✓ | Bombay Ice Cream | Cafe | 542 Valencia Street | Mission | San Francisco | CA | SF0051 | D0051 |
| ✓ | Broaster | Cafe | 1400 Market St. | Financial District | San Francisco | CA | SF0194 | D0194 |
| ✓ | Cafe Bean | Cafe | 800 Sutter St | Financial District | San Francisco | CA | SF0187 | D0187 |
| ✓ | Cafe Flore | Cafe | 2298 Market St | Castro / Noe Valley | San Francisco | CA | SF0167 | D0167 |
| ✓ | Cafe Grain D'or | Cafe | 700 Geary St. | Financial District | San Francisco | CA | SF0037 | D0037 |
| ✓ | Cafe Petra | Cafe | 483 Guerrero St. | Mission | San Francisco | CA | SF0186 | D0186 |
| ✓ | Cafico | Cafe | 1475 Market St. | Financial District | San Francisco | CA | SF0198 | D0198 |
| ✓ | Canvas Cafe | Cafe | 1200 9th Ave | Sunset / Richmond | San Francisco | CA | SF0212 | D0212 |
| ✓ | City Gourmet | Cafe | 590 3rd St. | SOMA | San Francisco | CA | SF0228 | D0228 |
| ✓ | Cup-O-Java | Cafe | 1600 Guerrero St. | Mission | San Francisco | CA | SF0206 | D0206 |
| ☐ | Daniel's Cafe | Cafe | 154 Ellis Street | Financial District | San Francisco | CA | SF0007 | D0007 |

*FIG. 9* danoo 866-93-Danoo

Welcome, Hua! (Logoff)　　　　　　　　　　　　　Danoo Idea Contact Service

Danoo Online ▸ Place an ad ▸ Select Clips ▸ Search Locations ▸ Select Locations ▸ Schedule Ad ▸ Confirm

[ < Back ]  [ Confirm selection>> ]  [ Cancel ]

**Your ad *A piece of content* will be placed on the following digital sign(s):**

| Start Time | Duration | Business Name | Location Type | Address | Neighborhood | City | State | Business Phone | Location | Sign |
|---|---|---|---|---|---|---|---|---|---|---|
| 2007-02-07 | 14 | 4th Street Bar | Bar | 55 4th St. | SOMA | San Francisco | | 415-442-6734 | SF0234 | D0234 |
| 2007-02-07 | 14 | Alex's | Bar | 4528 Mission St | Mission | San Francisco | | 415-584-5122 | SF0054 | D0054 |
| 2007-02-07 | 14 | Ali Baba | Cafe | 799 Valencia St | Mission | San Francisco | | 415-255-7820 | SF0143 | D0143 |
| 2007-02-07 | 14 | Ali Baba's Cave Cafe | Restaurant | 531 Haight St | Haight Ashbury | San Francisco | | 415-255-7820 | SF0142 | D0142 |
| 2007-02-07 | 14 | Alvin's | Cafe | 1708 Irving St | Sunset / Richmond | San Francisco | | 415-661-2888 | SF0074 | D0074 |
| 2007-02-07 | 14 | Baladie Gourmet Cafe | Cafe | 337 Kearney St. | Financial District | San Francisco | | 415-989-6629 | SF0221 | D0221 |
| 2007-02-07 | 14 | Bar None | Bar | 1980 Union St | Marina | San Francisco | | (415)409-4469 | SF0089 | D0089 |
| 2007-02-07 | 14 | Bayside Sports Bar & Grill | Bar | 1787 Union St | Marina | San Francisco | | 415-673-1565 | SF0090 | D0090 |
| 2007-02-07 | 14 | Beale Street Bar & Grill | Bar | 133 Beale St | Financial District | San Francisco | | (415) 543-1961?? | SF0023 | D0023 |
| 2007-02-07 | 14 | Bella Luca | Cafe | 418 Geary St. | Financial District | San Francisco | | 415-776-6777 | SF0010 | D0010 |
| 2007-02-07 | 14 | Bombay Ice Cream | Cafe | 542 Valencia Street | Mission | San Francisco | | 0 | SF0051 | D0051 |
| 2007-02-07 | 14 | Broaster | Cafe | 1400 Market St. | Financial District | San Francisco | | 415-748-0567 | SF0194 | D0194 |
| 2007-02-07 | 14 | Cafe Bean | Cafe | 800 Sutter St | Financial District | San Francisco | | 415-928-0888 | SF0187 | D0187 |
| 2007-02-07 | 14 | Cafe Flore | Cafe | 2298 Market St | Castro / Noe Valley | San Francisco | | 415-647-9691 | SF0167 | D0167 |
| 2007-02-07 | 14 | Cafe Grain D'or | Cafe | 700 Geary St. | Financial District | San Francisco | | 415-290-9882 | SF0037 | D0037 |
| 2007-02-07 | 14 | Cafe Petra | Cafe | 483 Guerro St. | Mission | San Francisco | | 415-626-9626 | SF0186 | D0186 |
| 2007-02-07 | 14 | Cafico | Cafe | 1475 Market St. | Financial District | San Francisco | | 415-748-0507 | SF0198 | D0198 |
| 2007-02-07 | 14 | Canvas Cafe | Cafe | 1200 9th Ave | Sunset / Richmond | San Francisco | | 415-374-6743 | SF0212 | D0212 |

*FIG. 10* danoo 866-93-Danoo

Welcome, Hua! (Logoff)      Danoo Idea  Contact  Service

Play List of Sign D0007

| Ad Type | Ads | Publish User | Startday | Endday | Approve Status | Action |
|---------|-----|--------------|----------|--------|----------------|--------|
| Danoo's Ad | send your works to us | admanager (david.liu@danouv.com) | 2007-01-28 | 2007-02-24 | Pending | Approve Reject |
| Danoo's Ad | events in SF 2/05-2/11 | admanager (david.liu@danouv.com) | 2007-02-05 | 2007-02-18 | Pending | Approve Reject |
| Venue's Ad | Default Venue Ad | SF0007 (SF0007@danouv.com) | 2006-07-01 | 2007-07-01 | Pending | Approve Reject |

Show Real Loop at 2007-02-07   [Date] [Show] [Back]

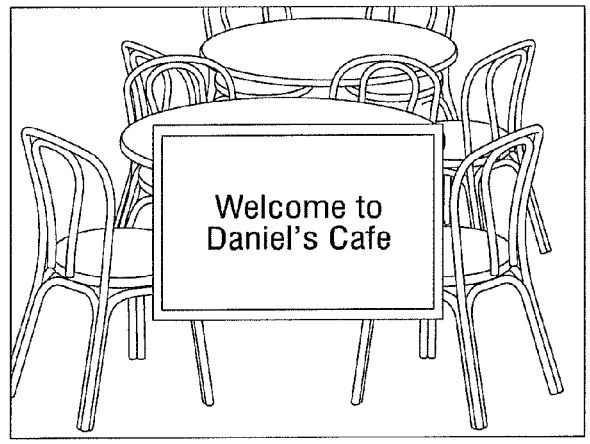

| Slot | Ad Code | Ad Type |
|------|---------|---------|
| 1 | Default Venue Ad | Venue's Ad |
| 2 | send your works to us | Danouv's Ad |
| 3 | Default Venue Ad | Venue's Ad |
| 4 | events in SF 2/05-2/11 | Danouv's Ad |

Copyright © 2007 Danoo Inc. All rights reserved. Privacy policy and terms of services.

FIG. 11 danoo

Danoo Network Campaign Report – Location Summary

| Campaign: | Sinfonietta | | | | | |
|---|---|---|---|---|---|---|
| Duration: | 1 Week | | No of Locations: | 69 | | |
| Start Date: | 10-17-2006 | | Total Traffic: | 135,250 | | |
| End Date: | 10-23-2006 | | Total No of Showings: | 328,320 | | |

| Location Name | Address | Neighborhood | City | State | Zip | Daily Traffic | Total Traffic | No of Showings per Day | Total No of Showings |
|---|---|---|---|---|---|---|---|---|---|
| Cafe Flore | 2298 Market St | Castro / Noe Valley | San Francisco | CA | 94114 | 800 | 4,000 | 1,152 | 5,760 |
| Harvey's | 500 Castro St. | Castro / Noe Valley | San Francisco | CA | 94110 | 450 | 2,250 | 1,152 | 5,760 |
| Metro | 3600 16th St. | Castro / Noe Valley | San Francisco | CA | 94114 | 500 | 2,500 | 576 | 2,880 |
| Baladie Gourmet Cafe | 337 Kearney St. | Financial District | San Francisco | CA | 94108 | 300 | 1,500 | 1,152 | 5,760 |
| Beale Street Bar & Grill | 133 Beale St | Financial District | San Francisco | CA | 94105 | 650 | 3,250 | 576 | 2,880 |
| Bella Luca | 418 Geary St. | Financial District | San Francisco | CA | 94102 | 1,000 | 5,000 | 1,152 | 5,760 |
| Broaster | 1400 Market St. | Financial District | San Francisco | CA | 94103 | 400 | 2,000 | 576 | 2,880 |
| Cafe Bean | 800 Sutter St | Financial District | San Francisco | CA | 94109 | 400 | 2,000 | 1,152 | 5,760 |
| Cafe Grain D'or | 700 Geary St. | Financial District | San Francisco | CA | 94109 | 250 | 1,250 | 1,152 | 5,760 |
| Catico | 1475 Market St. | Financial District | San Francisco | CA | 94103 | 500 | 2,500 | 576 | 2,880 |
| Daniel's Cafe | 154 Ellis Street | Financial District | San Francisco | CA | 94102 | 300 | 1,500 | 1,152 | 5,760 |
| Fida's Cafe | 350 California St | Financial District | San Francisco | CA | 94104 | 450 | 2,250 | 576 | 2,880 |
| Happy Donuts | 1455 Market St. | Financial District | San Francisco | CA | 94103 | 500 | 2,500 | 576 | 2,880 |
| Jana Chao | 1800 Hyde St. | Financial District | San Francisco | CA | 94109 | 300 | 1,500 | 1,152 | 5,760 |
| Katz Bagels | 606 Mission St. | Financial District | San Francisco | CA | 94105 | 400 | 2,000 | 1,152 | 5,760 |
| Lee's Deli | 303 2nd St. | Financial District | San Francisco | CA | 94107 | 1,000 | 5,000 | 576 | 2,880 |
| Lee's Deli | 115 New Montgomery St | Financial District | San Francisco | CA | 94105 | 300 | 1,500 | 576 | 2,880 |
| Lee's Deli | 75 Battery St | Financial District | San Francisco | CA | 94111 | 300 | 1,500 | 576 | 2,880 |
| Lee's Deli | 170 Spear St | Financial District | San Francisco | CA | 94105 | 300 | 1,500 | 576 | 2,880 |
| London Wine Bar | 415 Sansome St. | Financial District | San Francisco | CA | 94111 | 300 | 1,500 | 576 | 2,880 |
| Nile Cafe | 544 Jones St. | Financial District | San Francisco | CA | 94102 | 300 | 1,500 | 1,152 | 5,760 |
| Norton's Vault | 500 Sacramento St. | Financial District | San Francisco | CA | 94111 | 500 | 2,500 | 576 | 2,880 |
| Paisanos Coffee & Deli | 530 Kearny St. | Financial District | San Francisco | CA | 94108 | 300 | 1,500 | 1,152 | 5,760 |
| Shanghai Kelly's | 2064 Polk St | Financial District | San Francisco | CA | 94109 | 350 | 1,750 | 576 | 2,880 |

*FIG. 13*

METHOD AND APPARATUS FOR CONNECTING A NETWORK OF ELECTRONIC SIGNS

CROSS REFERENCE TO RELATED APPLICATIONS

This application is a Continuation of U.S. patent application Ser. No. 11/673,502, entitled "Method and Apparatus for Connecting a Network of Electronic Signs", filed Feb. 9, 2007, which claims priority to U.S. provisional patent applications, Ser. Nos. 60/772,490, filed 13 Feb. 2006 and 60/778,045, filed 2 Mar. 2006, each of which are incorporated herein in its entirety by this reference thereto.

BACKGROUND OF THE INVENTION

1. Technical Field

The invention relates to electronic signs. More particularly, the invention relates to a method and apparatus for connecting a network of electronic signs.

2. Description Of The Prior Art

In the retail world, "POP" is used to refer to point-of-purchase advertising displays. POP displays can take various forms, including shelf-mounted signs, hanging posters, and more. Because an estimated 70% of purchase decisions are made within the retail store itself, effective POP displays can have a dramatic impact on sales for a particular product category or brand.

Recently, static signs have begun to give way to electronic, dynamically updated point-of-purchase displays that present targeted product information, instant coupons, and more. To date, none of these systems provide a collaborative environment in which both content providers and merchants determine what is presented and when. It would be advantageous to provide a method and apparatus that allowed both the content providers and the owners of the electronic signs to cooperate in displaying and scheduling the display of content.

SUMMARY OF THE INVENTION

The invention provides a method and apparatus that allows owners of electronic signs, such as retailers, real estate owners, other space owners, and content providers, such as advertisers, entertainment producers, event promoters, visual artists, and general community to participate in an open content network. In the presently preferred embodiment, electronic signs are universally uniquely identified and then added to a network in a distributed fashion, after which content is selectively downloaded to the electronic signs. The times at which the content is presented are determined collaboratively by the owners of the electronic signs and the content providers. The invention further comprises a mechanism that verifies whether the content is actually presented on the electronic signs.

BRIEF DESCRIPTION OF THE DRAWINGS

FIG. 4 is a screenshot spelling a user webpage for a management feature of the invention, including content management, location management, sign management, and user management functions;

FIG. 5 is a screenshot showing the content management feature the invention in connection with the placing of an ad;

FIG. 6A shows the user dialogue in connection with the invention for selecting locations during the process of placing an ad, including targeting attributes such as demographics and geographic and keywords such as ethnicity, taste, status, sexuality, lifestyle, and interests (see FIGS. 6A and 6B);

FIG. 7 is a screenshot showing content selection in connection with the placing of an ad in accordance with the invention;

FIG. 8 is a screenshot showing the scheduling of an ad in connection with the placing of an ad in accordance with the invention;

FIG. 9 is a screenshot showing selection of locations or placement of an ad in accordance with the invention;

FIG. 10 is a screenshot showing a confirmation of location selection and scheduling in accordance with the invention;

FIG. 11 is a screenshot showing a play list of ads including ad types, the ads themselves, the published user, the start date, the end date, the pre-status, and the action in accordance with the invention;

FIG. 13 is screenshot showing a campaign report location summary in accordance with the invention.

DETAILED DESCRIPTION OF THE INVENTION

The invention provides a method and apparatus that allows owners of electronic signs, such as retailers, real estate owners, other space owners, and content providers, such as advertisers, entertainment producers, event promoters, visual artists, and the general community to participate in an open content network. In the presently preferred embodiment, electronic signs are universally uniquely identified and then added to a network in a distributed fashion, after which content is selectively downloaded to the electronic signs. The times at which the content is presented are determined collaboratively by the owners of the electronic signs and the content providers. The invention further comprises a mechanism that verifies whether the content is actually presented on the electronic signs.

Figure 1:
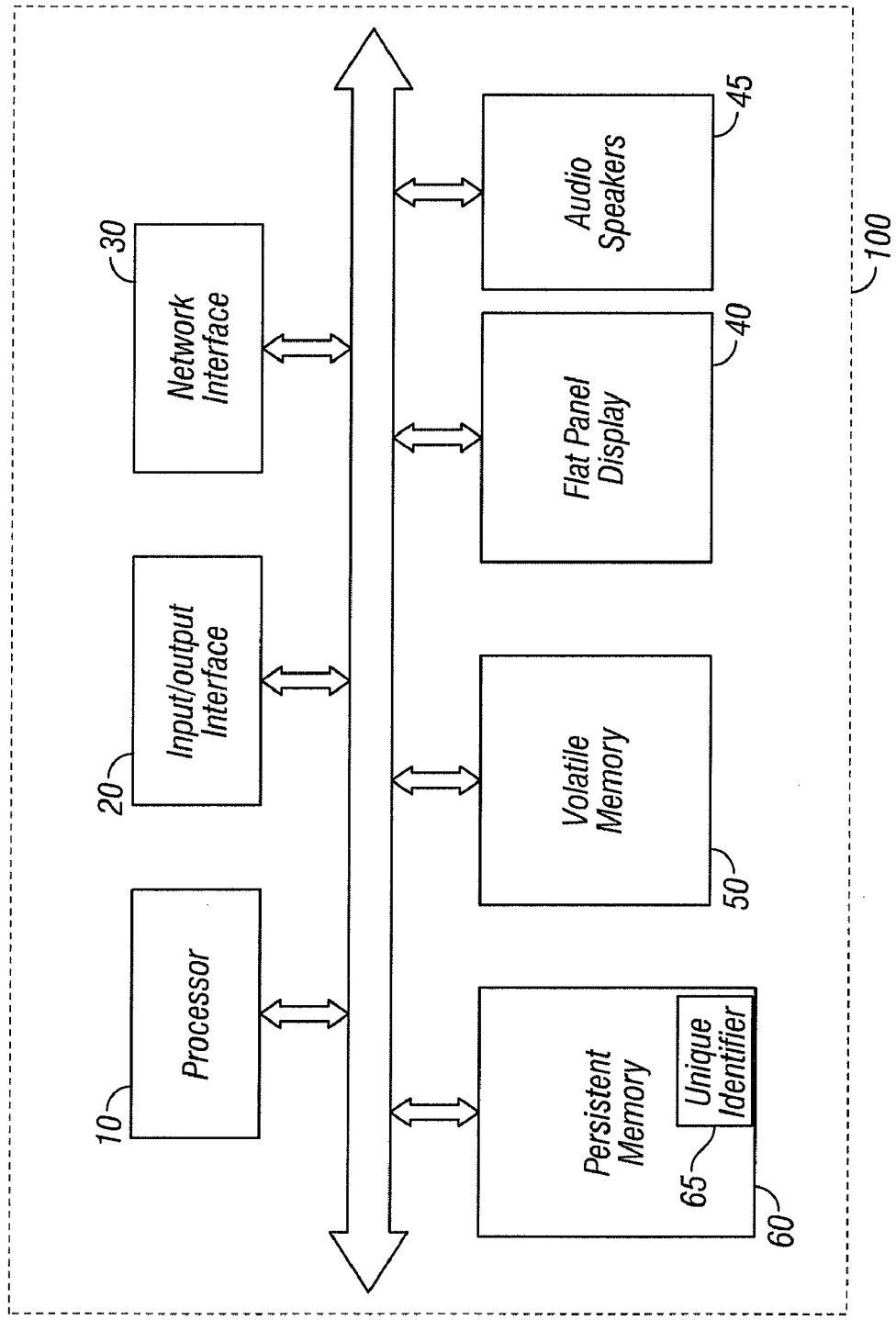
FIG. 1 is a block diagram of an electronic sign according to the invention.

Referring to FIG. 1, the invention provides an electronic sign device that processes and presents visual and audio content. The presently preferred embodiment of the device 100 comprises a processor 10, a volatile memory 50, and a persistent memory 60 that are arranged to store and present electronic content. The device further comprises an input/output interface 20 and a network interface 30 for communication with external data sources. The device further comprises a display 40, such as a flat panel display, and optionally, one or more audio speakers 45 through which content is presented. The flat panel display can comprise, for example, an LCD panel, plasma display, front projection screen, or rear projection screen.

In one of its aspects, the invention provides a means for an electronic sign to identify itself universally. Each electronic sign is assigned a universally unique identifier 65 which is stored in the persistent memory of the electronic sign. In one embodiment, the MAC address of a network interface card is used as the unique identifier for the electronic sign. Other uniquely assigned numbers or strings, such as processor ID numbers and/or sequentially assigned alphanumerical strings, may also serve as a unique identifier.

In another of its aspects, the invention provides means to record a history of content presented on the electronic sign. The history of content that has been presented is written into the persistent memory of the electronic sign. In one embodiment, the history file is encrypted using a public key encryption algorithm to provide authenticity that establishes that the file is not falsely constructed. Other predetermined encryption algorithms may also be used to provide authenticity. The history provides a mechanism for verifying that specific content was actually presented on the electronic sign. This is useful for collecting statistics to identify effective campaigns, learn about a market, establish advertising rates, and the like.

Figure 2:
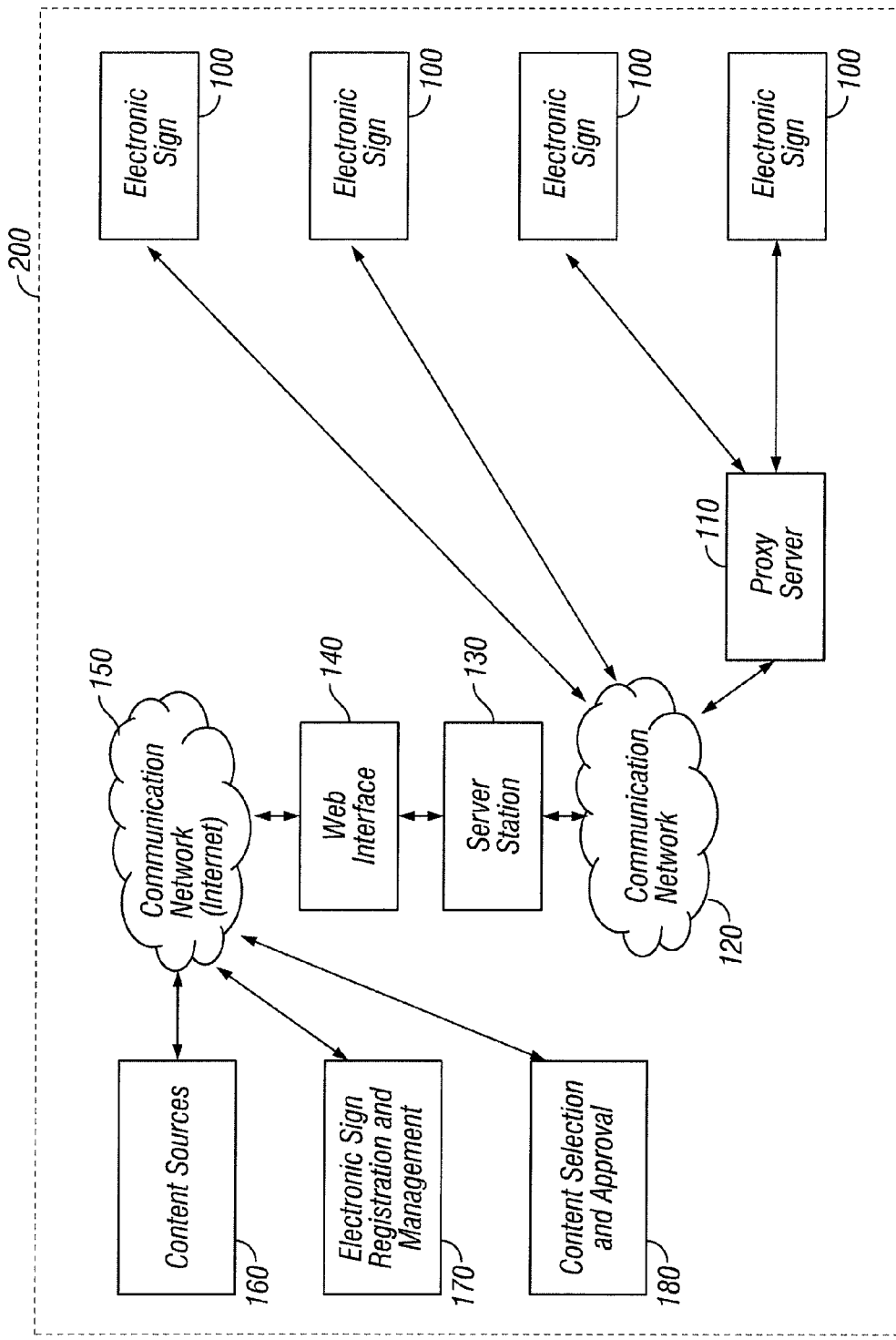
FIG. 2 is a block diagram of a network of electronic signs of FIG. 1 according to the invention.

Referring to FIG. 2, the invention provides a system 200 for connecting a plurality of electronic signs 100 into a content network 130 comprising one or more electronic signs 100 according to the invention; and server configured to store registration information for electronic signs, content files, information on how content files should be targeted to electronic signs, content selection and approval information, and histories of content presentation on electronic signs.

The server may comprise a single installation or a distributed system, and includes:

A set of functions to manage a network of electronic signs and content presented on the electronic signs. The functions are presented via a web interface 140, which is provided to owners of electronic signs and content providers to access the set of functions, and which includes:

Means for registering and managing a plurality of electronic signs 170 in a content network. Each electronic sign is registered using its unique identifier along with other identifying information, including type and size of the electronic sign, physical address where the electronic sign is located, business type to which the electronic sign belongs, viewer demographics of the electronic sign, tags for preferred content types, as well as other rating information of the electronic sign;

Means for uploading electronic visual and audio content 160 from content sources to the server. Content uploaded to the server is targeted to one or more electronic signs based on any or all of the registration information for the electronic signs; and Means for owners of electronic signs to select and approve content to be presented 180 on the electronic signs.

The system also comprises:

A communication network 120 for example, the Internet, that provides network access to the set of functions to manage the network of electronic signs;

Another communication network 150, which in principal can be identical to the first communication network, that provides network connections for electronic signs to communication with the server; and A proxy server 110, which can be used in place of direct network access, to synchronize the content between electronic signs and the server, using a network or a portable data transportation medium.

A presently preferred embodiment of the invention functions in the following manner:

New owners of electronic signs join the content network by registering their electronic signs through a Web interface. Each electronic sign is registered using its unique identifier, along with other identifying information including type and size of the electronic sign, physical address where the electronic sign is located, business type to which the electronic sign belongs, viewer demographics of the electronic sign, tags for preferred content types, as well as other rating information of the electronic sign. Viewer demographics include age, gender, income level, marital status, occupation, and ethnicity. Examples of tags for content types include typical content categories, such as people, places, things, art, animation, and sports.

Owners of electronic signs manage electronic signs through the Web interface. All registered electronic signs are listed; registration information of electronic signs can be updated; electronic signs can be added and removed from the system.

Content provides, i.e. content sources, register on the server through the Web interface. Content providers are then able to upload electronic visual and audio content to the server. Content providers can also specify which electronic signs the content is to be presented on by listing the criteria that electronic signs need to meet. Such criteria include types and sizes of electronic signs, physical addresses where electronic signs are located, business types to which electronic signs belong, viewer demographics of electronic signs, tags for preferred content types, as well as unique identifications of electronic signs, among other information to describe the targeted electronic signs.

Content targeted to an electronic sign waits for approval by the owner of the electronic sign before it is presented on the electronic sign. When the owner of the electronic sign logs onto the system through the Web interface, all content waiting for approval is listed. If approved, the content is presented on the electronic sign. If rejected, the content is not presented on the electronic sign.

Through the Web interface, the owner of an electronic sign can also arrange the order and timing of content presented on the electronic sign.

An electronic sign is connected to the content network via a communication network, through an additional proxy server, or both. When connected through a communication network, the electronic sign communicates and exchanges data with the server directly via the network. Presently contemplated types of network connection include both wired and wireless networks, such as cable modems, dedicated subscriber line (DSL), phone line modems, cellular or mobile networks, Ethernet, Wifi networks, and WiMax networks. When connected through a proxy server, the electronic sign first exchanges data with the proxy server through physical storage devices, such as USB disks, SD cards, and CompactFlash cards. The proxy server then exchanges the data with the server via the proxy server.

Figure 3:
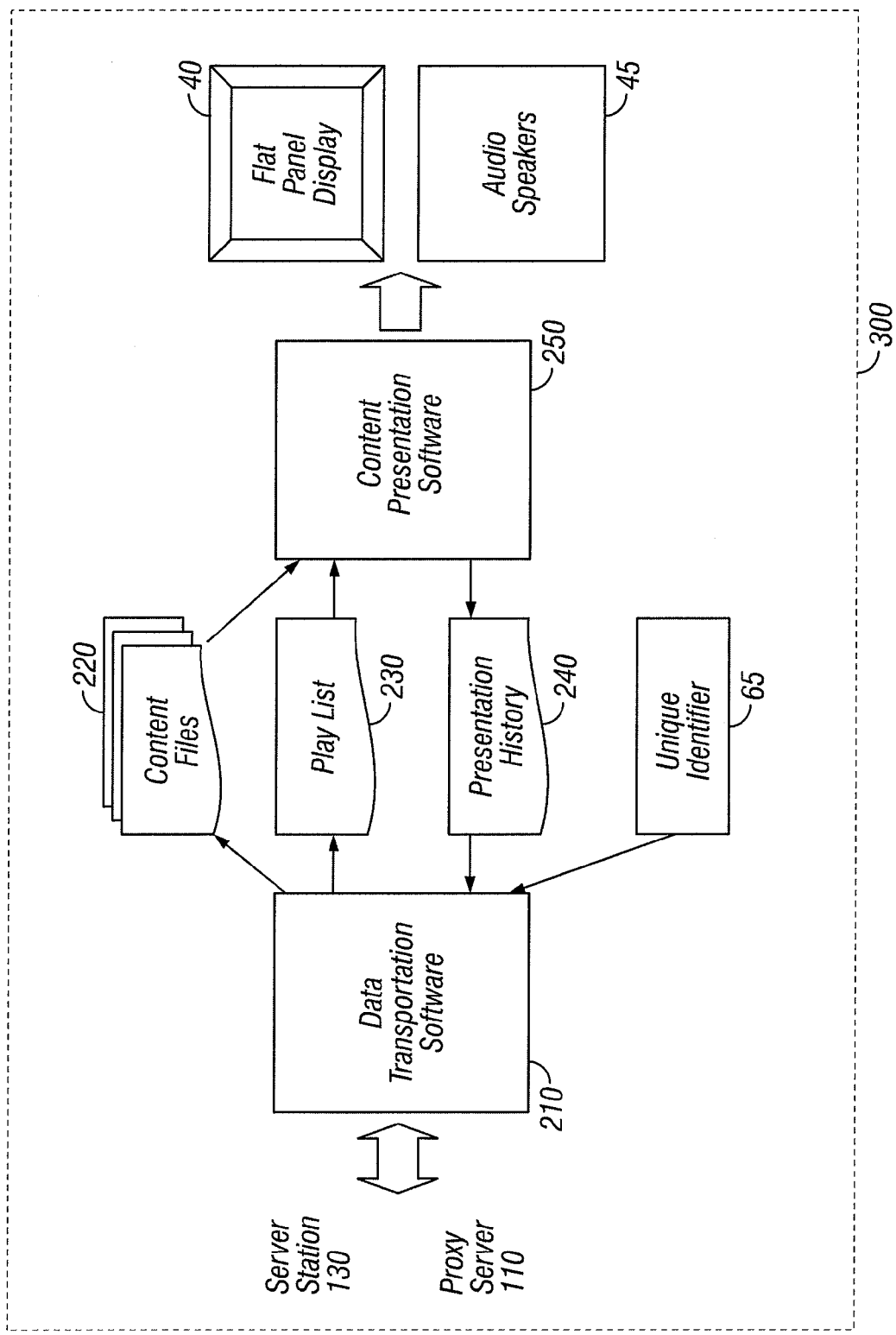
FIG. 3 is a block diagram of software on the electronic sign of FIG. 1 according to the invention.

Referring to FIG. 3, the invention provides necessary software 300 on the electronic signs to download visual and audio content, present the content, and record a presentation history. The data transportation software 210 uses the unique identifier 65 to determine and download appropriate content to the server 130, or via the proxy server 110. Content is downloaded in the form of content files 220 and a play list 230 that describes how content should be presented. Content files can be in the form of video such as MPEG files, pictures such as JPEG, GIF, TIFF files, animation such as Flash files, and slide shows such as a sequence of JPEG, GIF, TIFF files. Likewise, audio in any format such as AIF, WAV, and MP3 can accompany the content or can be presented separately. At the same time, presentation history 240 is uploaded to the server. The presentation history is processed on the server to determine how many times a content file is played on the electronic sign and when it is played on the electronic sign. Content presentation software 250 reads in the play list and content files, and uses the flat panel display 40 and audio speakers 45 to present the content. After each play of a content file, a record is written into the presentation history that contains the content file name or index and the time at which the content file was played. Such record is encrypted to ensure validity of the record and is uploaded to the server periodically to determine the actual number of times the content is presented on the electronic sign. In many situations, an advertiser may determine to pay the owner of the electronic sign a placement fee for every time an ad is shown. Having the presentation history provides an audit trail to determine actual performance.

FIG. 1 is a block diagram of an electronic sign according to the invention.

FIG. 2 is a block diagram of a network of electronic signs of FIG. 1 according to the invention.

FIG. 3 is a block diagram of software on the electronic sign of FIG. 1 according to the invention.

FIG. 4 is a screenshot spelling a user webpage for a management feature of the invention, including content management, location management, sign management, and user management functions.

FIG. 5 is a screenshot showing the content management feature the invention in connection with the placing of an ad.

FIG. 6A shows the user dialogue in connection with the invention for selecting locations during the process of placing an ad, including targeting attributes such as demographics and geographics and keywords such as ethnicity, taste, status, sexuality, lifestyle, and interests (see FIGS. 6A and 6B).

FIG. 7 is a screenshot showing content selection in connection with the placing of an ad in accordance with the invention.

FIG. 8 is a screenshot showing the scheduling of an ad in connection with the placing of an ad in accordance with the invention.

FIG. 9 is a screenshot showing selection of locations or placement of an ad in accordance with the invention.

FIG. 10 is a screenshot showing a confirmation of location selection and scheduling in accordance with the invention.

FIG. 11 is a screenshot showing a play list of ads including ad types, the ads themselves, the published user, the start date, the end date, the pre-status, and the action in accordance with the invention.

Figure 12:
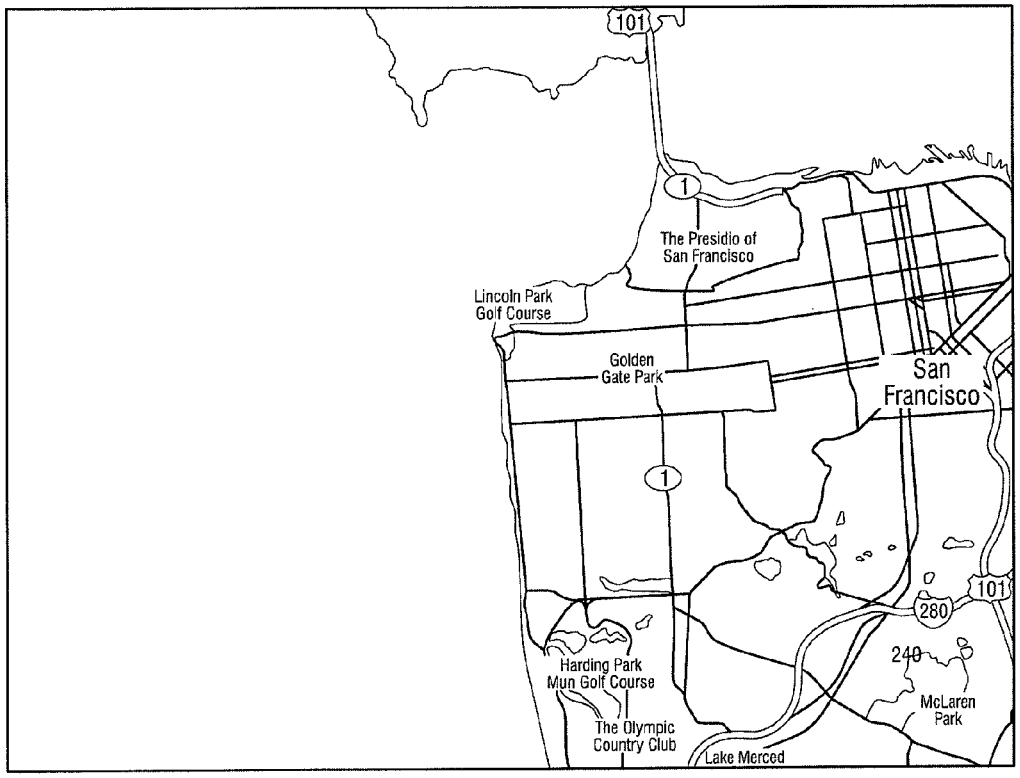
FIG. 12 is a screenshot showing a campaign report location map in accordance with the invention.

FIG. 12 is a screenshot showing a campaign report location map in accordance with the invention.

FIG. 13 is screenshot showing a campaign report location summary in accordance with the invention.

Figure 14:
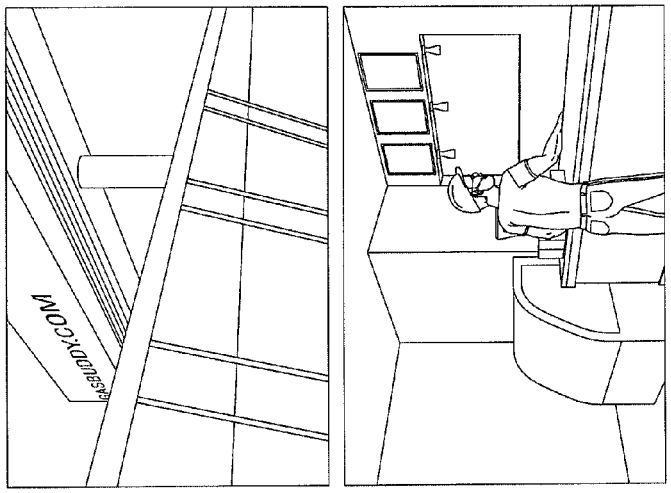
FIG. 14 is a screenshot showing a location card for a particular neighborhood and location in accordance with the invention.

FIG. 14 is a screenshot showing a location card for a particular neighborhood and location in accordance with the invention.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A content distribution method, comprising the steps of:
providing a plurality of electronic signs distributed among a plurality of locations;
providing each electronic sign with a universal, unique identifier, wherein each electronic sign is associated with an owning entity;
associating said electronic signs with a distributed electronic network;
selectively downloading content published by any of a plurality of content providers to said electronic signs;
said owners of said electronic signs and said content providers collaboratively determining what content is downloaded to said electronic signs and times at which said content is presented on said electronic signs; and
providing a set of functions for managing at least electronic sign from among said plurality of electronic signs and content presented on said electronic signs, wherein said set of functions is presented via a web interface which is provided to owners of electronic signs and content providers to access said set of functions, wherein said web interface configured to perform the steps of:
registering and managing at least electronic sign from among said plurality of electronic signs in a content network, wherein each electronic sign is registered using its unique identifier along with other identifying information in the form of viewer demographics; and
uploading electronic visual and audio content from content sources to a server, wherein content uploaded to said server is targeted to one or more electronic signs based on any or all of said registration information for the electronic signs; and said owners of said electronic signs selecting and approving content to be presented on their electronic signs.

2. The method of claim 1, said step of providing each electronic sign with a universal, unique identifier comprising the step of:
using a MAC address of a network interface card for at least one electronic sign as a unique identifier for said electronic sign.

3. The method of claim 1, said step of recording a history of content further comprising the step of:
encrypting said history file using a public key encryption algorithm to provide authenticity that establishes that said history file is not falsely constructed.

4. The method of claim 1, further comprising the step of:
providing a server configured to store registration information for electronic signs, content files, information on how content files should be targeted to electronic signs, content selection and approval information, and histories of content presentation on electronic signs.

5. The method of claim 1, further comprising the steps of:
recording a history of content presented on each electronic sign; and
verifying whether said content is actually presented on said electronic signs with said recorded history.

6. The method of claim 1, said other identifying information further comprising any of:
type and size of the electronic sign,
physical address where the electronic sign is located,
business type to which the electronic sign belongs, and
other rating information of the electronic sign.

7. The method of claim 1, further comprising the step of:
providing a first communication network that provides network access to said set of functions to manage said network of electronic signs; and
providing a second communication network that provides network connections for electronic signs to communication with a server.

8. The method of claim 7, further comprising the step of:
providing a proxy server to synchronize content between said electronic signs and said server, using a network or a portable data transportation medium.

9. A content distribution method, comprising the steps of:
owners of electronic signs joining a content network by registering their electronic signs on a server through a Web interface;
wherein each electronic sign is registered using a unique identifier, along with other identifying information in the form of viewer demographics of said electronic sign, owners of said electronic signs managing their electronic signs through said Web interface;

content providers comprising content sources registering on said server through said Web interface;

said content providers uploading electronic visual and audio content to said server;

said content providers specifying which electronic signs said content is to be presented on by listing criteria that electronic signs need to meet, said criteria in the form of viewer demographics of electronic signs, content targeted to an electronic sign waiting for approval by an owner of an electronic sign before it is presented on an electronic sign;

listing all content waiting for approval when an owner of an electronic sign logs onto said network through said Web interface;

wherein if said content approved by said owner of said electronic sign, said content is presented on said electronic sign; and wherein if said content is rejected by said owner of said electronic sign, said content is not presented on said electronic sign.

said owner of an electronic sign arranging an order and timing of content presented on said electronic sign through said Web interface.

10. The method of claim 9, wherein said criteria further comprising any of type and size of electronic sign, physical address where said electronic sign is located, business type to which said electronic sign belongs, and other rating information of said electronic sign.

11. The method of claim 9, wherein all registered electronic signs are listed, registration information of electronic signs can be updated, electronic signs can be removed from said network, and statistics on which electronic signs can be and have been viewed are provided.

12. The method of claim 9, wherein said other identifying information comprises any of:
types and sizes of electronic signs,
physical addresses where electronic signs are located,
business types to which electronic signs belong,
unique identifications of electronic signs, and
other information to describe targeted electronic signs.

13. The method of claim 9, further comprising the step of:
connecting an electronic sign to said content network via any of a communication network and through a proxy server;
wherein, when connected through a communication network, said electronic sign communicates and exchanges data with said server directly via said network; and
wherein, when connected through a proxy server, said electronic sign first exchanges data with said proxy server through at least one physical storage device, said proxy server then exchanging said data with said server via said proxy server.

14. The method of claim 9, further comprising the steps of:
providing a data transportation module that uses said unique identifier to determine and download appropriate content either to said server or via said proxy server;
wherein content is downloaded in the form of content files and a play list that describes how content should be presented; and
collecting a presentation history at said electronic sign;
uploading said presentation history from said electronic sign to said server;
providing a content presentation module that receives said play list and content files and that provides said content for presentation; and
writing an encrypted record into said presentation history after each play of a content file.

15. A content distribution apparatus, comprising:
a plurality of electronic signs distributed among a plurality of locations;
each electronic sign comprising a universal, unique identifier, wherein each electronic sign is associated with an owning entity;
means for associating said electronic signs with a distributed electronic network;
means for selectively downloading content published by any of a plurality of content providers to said electronic signs;
means for said owners of said electronic signs and said content providers collaboratively determining what content is downloaded to said electronic signs and times at which said content is presented on said electronic signs;
means for recording a history of content presented on each electronic sign; and
means for verifying whether said content is actually presented on said electronic signs with said recorded history; and
a set of functions for managing a network of electronic signs and content presented on said electronic signs, wherein said set of functions is presented via a web interface which is provided to owners of electronic signs and content providers to access said set of functions, wherein said web interface further comprises:
means for registering and managing a plurality of electronic signs in a content network, wherein each electronic sign is registered using its unique identifier along with other identifying information in the form of viewer demographics of the electronic sign;
means for uploading electronic visual and audio content from content sources to a server, wherein content uploaded to said server is targeted to one or more electronic signs based on any or all of said registration information for the electronic signs; and
means for said owners of said electronic signs to selecting and approving content to be presented on their electronic signs.

16. The content distribution apparatus of claim 15, wherein said other identifying information comprises any of type and size of the electronic sign, physical address where the electronic sign is located, business type to which the electronic sign belongs, viewer demographics of the electronic sign, and other rating information of the electronic sign.

17. The apparatus of claim 16, further comprising:
a first communication network that provides network access to said set of functions to manage said network of electronic signs;
a second communication network that provides network connections for electronic signs to communication with a server; and
a proxy server to synchronize content between said electronic signs and said server, using a network or a portable data transportation medium.

18. The apparatus of claim 15, said universal, unique identifier comprising:
a MAC address of a network interface card for at least one electronic sign as a unique identifier for said electronic sign.

19. The apparatus of claim 15, said history of content further comprising:
means for encrypting said history file using a public key encryption algorithm to provide authenticity that establishes that said history file is not falsely constructed.

20. The apparatus of claim 15, further comprising:
a server configured to store registration information for electronic signs, content files, information on how content files should be targeted to electronic signs, content selection and approval information, and histories of content presentation on electronic signs.

21. A content distribution apparatus, comprising:
a Web interface for owners of electronic signs joining a content network by registering their electronic signs on a server;
wherein each electronic sign is registered using a unique identifier, along with other identifying information comprising any of type and size of electronic sign, physical address where said electronic sign is located, business type to which said electronic sign belongs, viewer demographics of said electronic sign, and other rating information of said electronic sign;
said Web interface further comprising means for owners of said electronic signs managing their electronic signs;
wherein all registered electronic signs are listed, registration information of electronic signs can be updated, electronic signs can be removed from said network, and statistics on which electronic signs can be and have been viewed are provided;
a plurality content providers comprising content sources registered on said server through said Web interface;
said Web interface further comprising means for said content providers uploading electronic visual and audio content to said server;
means for said content providers specifying which electronic signs said content is to be presented on by listing criteria that electronic signs need to meet, said criteria comprising viewer demographics of electronic signs, unique identifications of electronic signs, and other information to describe targeted electronic signs;
means for content targeted to an electronic sign waiting for approval by an owner of an electronic sign before it is presented on an electronic sign;
aid Web interface further comprising means for listing all content waiting for approval when an owner of an electronic sign logs onto said network;
wherein if said content approved by said owner of said electronic sign, said content is presented on said electronic sign; and
wherein if said content is rejected by said owner of said electronic sign, said content is not presented on said electronic sign;
said Web interface further comprising means for said owner of an electronic sign arranging an order and timing of content presented on said electronic sign.

* * * * *